US 10,036,824 B2

(12) United States Patent
Miles et al.

(10) Patent No.: US 10,036,824 B2
(45) Date of Patent: *Jul. 31, 2018

(54) ELECTROMAGNETIC SYSTEM UTILIZING MULTIPLE PULSE TRANSMITTER WAVEFORMS

(71) Applicant: CGG DATA SERVICES AG, Zug (CH)

(72) Inventors: Philip John Miles, Oakville (CA); Jason Conrad Berringer, Rockwood (CA); Tianyou Chen, Mississauga (CA); David Gregory Hodges, Mississauga (CA)

(73) Assignee: CGG DATA SERVICES AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,008

(22) Filed: Jun. 13, 2017

(65) Prior Publication Data
US 2017/0276821 A1 Sep. 28, 2017

Related U.S. Application Data

(63) Continuation of application No. 14/432,614, filed as application No. PCT/CA2013/000878 on Oct. 15, 2013, now Pat. No. 9,709,691.

(Continued)

(51) Int. Cl.
*G01V 3/08* (2006.01)
*G01V 3/17* (2006.01)
*G01V 3/165* (2006.01)

(52) U.S. Cl.
CPC ............... *G01V 3/17* (2013.01); *G01V 3/165* (2013.01)

(58) Field of Classification Search
CPC . G01V 3/00; G01V 3/08; G01V 3/081; G01V 3/10; G01V 3/101; G01V 3/102;
(Continued)

(56) References Cited

U.S. PATENT DOCUMENTS 3,737,768 A    6/1973  Lazenby et al.
3,775,671 A *  11/1973 Brown ................... G01V 3/32
                                            324/303
(Continued)

FOREIGN PATENT DOCUMENTS

CA    2766708 A1    8/2012
DK     177181 B1    5/2012
(Continued)

OTHER PUBLICATIONS

International Search Report, dated Dec. 10, 2013, in related Application No. PCT/CA2013/000878.
(Continued)

*Primary Examiner* — Patrick Assouad
*Assistant Examiner* — Demetrius Pretlow
(74) *Attorney, Agent, or Firm* — Patent Portfolio Builders PLLC

(57) ABSTRACT

The present invention provides a transmitter for an electromagnetic survey system for transmitting signals having a waveform comprising at least a first pulse and a second pulse, wherein the first and second pulses are different in at least one of shape and power. Embodiments of the invention enable combining various distinct pulses that may have been optimized for respective applications to form a transmitter waveform for conducting a geological survey. In effect, the embodiments of the present invention provides an EM system that is substantially equivalent to multiple EM systems operating at the same time for collecting data in relation to different aspects of the geology of interest.

(Continued)

Advantageously, the benefits of the present invention can be obtained without the undesirable complexity and cost associated with the simultaneous deployment of multiple EM systems.

20 Claims, 7 Drawing Sheets

Related U.S. Application Data

(60) Provisional application No. 61/713,105, filed on Oct. 12, 2012.

(58) Field of Classification Search
CPC ........ G01V 3/104; G01V 3/105; G01V 3/107; G01V 3/108; G01V 3/15; G01V 3/16; G01V 3/165; G01V 2003/084; G01V 3/26; G01V 3/28; G01V 3/12; G01V 3/30; G01V 3/02; G01V 3/38; G01V 3/088; G01V 3/265; G01V 3/20; G01V 3/04; G01V 3/06; G01V 3/22; G01V 3/24; G01V 2003/085; G01V 2003/086; E21B 49/005; E21B 49/08; E21B 47/102; G01N 33/2823; G01N 27/76; G01N 33/0031; G01R 33/16; G01R 33/56536; H01F 1/0018; H01F 17/062; B01F 15/00227; G02F 2202/42; H01L 21/76835; H01L 37/02
USPC .................................................. 324/323–375
See application file for complete search history.

(56) References Cited

U.S. PATENT DOCUMENTS

| | | | |
|---|---|---|---|
| 3,806,795 A | 4/1974 | Morey | |
| 3,950,695 A | 4/1976 | Barringer | |
| 4,417,210 A | 11/1983 | Rocroi et al. | |
| 4,535,293 A * | 8/1985 | Rocroi | G01V 3/02 324/102 |
| 7,298,869 B1 * | 11/2007 | Abernathy | G06K 9/0063 324/323 |
| 9,405,031 B2 | 8/2016 | Sorensen | |
| 2007/0177705 A1 | 8/2007 | Lu et al. | |
| 2008/0143130 A1 * | 6/2008 | Kuzmin | G01V 3/17 294/77 |
| 2009/0189593 A1 * | 7/2009 | Bratfisch | G01R 19/2506 324/76.11 |
| 2009/0243613 A1 | 10/2009 | Lu et al. | |
| 2010/0019929 A1 * | 1/2010 | Heelan | H04B 13/02 340/850 |
| 2011/0050230 A1 * | 3/2011 | Kuzmin | G01V 3/165 324/330 |
| 2011/0087435 A1 * | 4/2011 | Hornbostel | G01V 3/083 702/13 |
| 2012/0293177 A1 * | 11/2012 | Dodds | G01V 3/17 324/331 |
| 2014/0218038 A1 | 8/2014 | Sorensen | |

FOREIGN PATENT DOCUMENTS

| | | |
|---|---|---|
| GB | 883465 A | 11/1931 |
| GB | 883465 A | 11/1961 |
| SU | 1603329 A1 | 10/1990 |
| WO | 2009041343 A1 | 4/2009 |

OTHER PUBLICATIONS

Third Party Observation, submitted Feb. 11, 2015, in related Application No. PCT/CA2013/000878.

Third Party Observations, dated Feb. 11, 2015, filed on behalf of SkyTEM Surveys A/S, in related Application No. PCT/CA2013/000878.

Written Opinion of the International Searching Authority, dated Dec. 10, 2013, in related Application No. PCT/CA2013/000878.

* cited by examiner

ELECTROMAGNETIC SYSTEM UTILIZING MULTIPLE PULSE TRANSMITTER WAVEFORMS

CROSS REFERENCE TO RELATED APPLICATIONS

This application is a continuation of U.S. patent application Ser. No. 14/432,614, filed Mar. 31, 2015, which is a National Stage of PCT Application No. PCT/CA2013/000878, filed Oct. 15, 2013, which is related to, and claims priority from, U.S. Provisional Patent Application Ser. No. 61/713,105 filed Oct. 12, 2012, the disclosure of which is incorporated here by reference.

FIELD OF THE INVENTION

The present invention relates to electromagnetic systems, and more particularly, to systems and methods for conducting geophysical surveys using multiple pulse transmitter waveforms.

BACKGROUND OF THE INVENTION

Electromagnetic (EM) measurement systems for geophysical measurement purposes detect the electric and magnetic fields that can be measured in, on or above the earth, to identify subsurface changes in electrical properties of materials beneath the earth's surface. Airborne EM systems carry out field measurements in the air above the earth. A primary goal is to make measurements at a number of spatial locations to identify the size and position of localized material property changes. Such changes can be attributed to a desired outcome such as identifying a localized mineral deposit, a buried object, or the presence or absence of water.

Generally speaking, EM systems usually include a source of electromagnetic energy (transmitter) and a receiver to detect the response of the ground. EM systems can be either frequency-domain or time-domain. Both types of systems are based on principles encapsulated in Faraday's Law of electromagnetic induction, which states that a time-varying primary magnetic field will produce an electric field. For airborne systems, the primary field is created by passing a current through a transmitter loop (or series of transmitter loops). The temporal changes to the created or radiated magnetic field induce electrical eddy currents in the ground. These currents have an associated secondary magnetic field that can be sensed, together with the primary field, by a series of receiver coils.

Each receiver coil may consist of a series of wire loops, in which a voltage is induced proportional to the strength of the eddy currents in the ground and their rate of change with time. Typical receiver coils have axes in the three Cartesian directions that are orthogonal to one another. Coils with their axes perpendicular to the earth are most sensitive to horizontal layers and half-spaces. Coils with their axes horizontal are more sensitive to discrete or vertical conductors.

In frequency-domain systems, the time-varying transmitter signal is a sinusoidal waveform of constant frequency, inducing electrical currents in the ground of the same frequency. Most systems use several constant frequencies that are treated independently. Although the secondary field has the same frequency as the primary field, it will have a different amplitude and phase.

For time-domain systems, a time-varying field is created by a current that may be pulsed. The change in the transmitted current induces an electrical current in the ground that persists after the primary field is turned off. Typical time domain receiver coils measure the rate of change of this secondary field. The time-domain transmitter current waveform repeats itself periodically and can be transformed to the frequency domain where each harmonic has a specific amplitude and phase.

Existing prior art EM systems have limitations in surveying various terrains and geologies. For example, time domain EM systems existing in the prior art are typically configured or optimized to measure a particular type of terrain or geology near an estimated depth, based on a number of considerations pertinent to each task. These time domain EM systems generally are not well-equipped to deal with surveys of complex geology, which may comprise a mixture of deep and shallow geological structures, and/or strong and weak conductivities.

As a result, in some surveys of complex terrain or geology where existing prior art time domain EM systems were used, the geology of interest would be flown over multiple times, each with a specifically configured EM system for detecting one specific aspect of the terrain or geology. While this approach may provide desirable survey resolution, it is generally time consuming and not cost-effective.

In some ground-based EM systems existing in the prior art, such as the Geonics™ EM-37 system, two or more transmitter waveforms were used to collect shallow and deep ground information, wherein repeated pulses of a first waveform are transmitted and measured, followed by the transmission and measurement of repeated pulses of a second waveform. In contrast, for an airborne EM system which is constantly moving, it may be difficult to use a dual waveform system to collect responses from both waveforms over the same geology, which results in poor survey resolution for the combined waveform survey data.

Therefore, there remains a need for an improved EM surveying system that can efficiently and cost-effectively provide measurements of various terrains and complex geologies.

SUMMARY OF THE INVENTION

The present invention overcomes the above drawbacks of the prior art EM systems by providing an electromagnetic survey transmitter for transmitting signals having a waveform comprising multiple pulses that are different in shape and/or power, and providing an airborne EM system that is configurable to transmit signals having a waveform comprising multiple pulses that are different in shape and/or power.

The present invention improves the overall resolution of measurements from pulses of the transmitter waveform, and provides advantages in defining geology. The present invention provides benefits that are comparable to those achievable using multiple simultaneously deployed EM systems, without the undesirable integration complexity and the cost associated therewith.

In accordance with one aspect of the present invention, there is provided an electromagnetic survey system, comprising: a transmitter for transmitting signals having a waveform comprising at least a first pulse and a second pulse, said first pulse and second pulse are different in at least one of shape and power; and a receiver for measuring responses from said signals.

In accordance with another aspect of the present invention, there is provided a transmitter for an electromagnetic survey system for transmitting signals having a waveform comprising at least a first pulse and a second pulse, said first pulse and second pulse are different in at least one of shape and power.

In accordance with another aspect of the present invention, there is provided a method of conducting geological survey, comprising: transmitting signals having a waveform comprising at least a first pulse and a second pulse, said first pulse and second pulse are different in at least one of shape and power; and measuring responses from said signals.

Preferably, the transmitter waveform cycles are repeated without overlap in time.

Preferably, the receiver of the electromagnetic survey system measures the responses from waveform cycles during and after each (or all) pulse(s) of the waveform have been transmitted.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

The present invention will now be described with reference to the accompanying drawings, in which some, but not all embodiments of the invention are shown.

Figure 1:
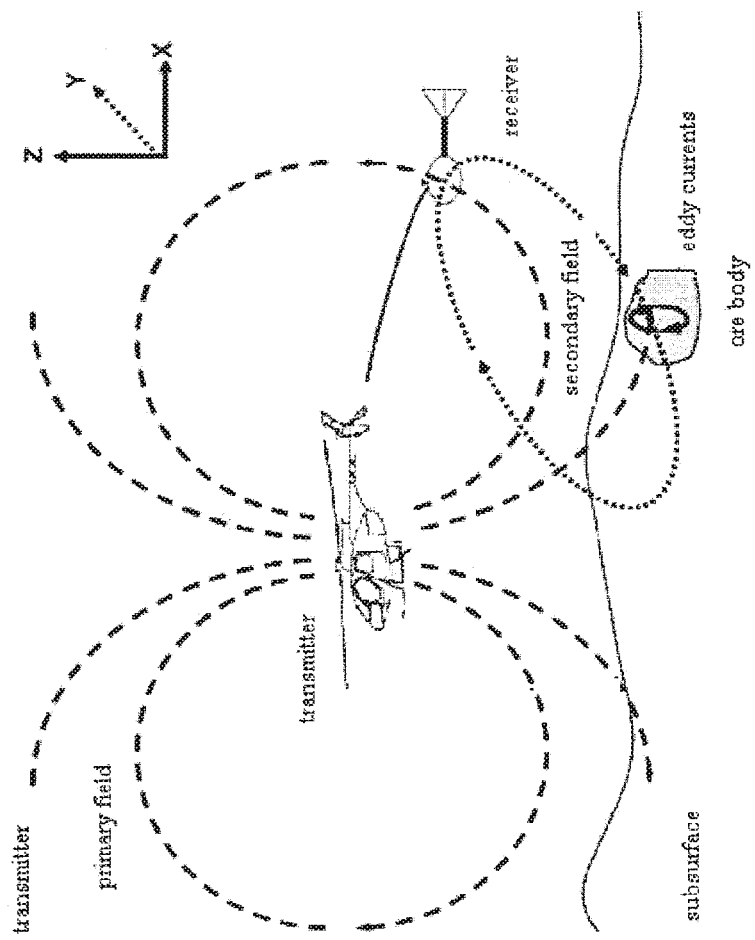
FIG. 1 is a diagram of one configuration of an EM system in accordance with prior art.

Illustrated in FIG. 1 is an airborne EM system known in the art, wherein the primary field is created by passing a current through a transmitter loop (or series of transmitter loops). The temporal changes to the created or radiated magnetic field induce electrical eddy currents in the ground. These currents have an associated secondary magnetic field that can be sensed, together with the primary field, by a series of receiver coils.

Figure 2:
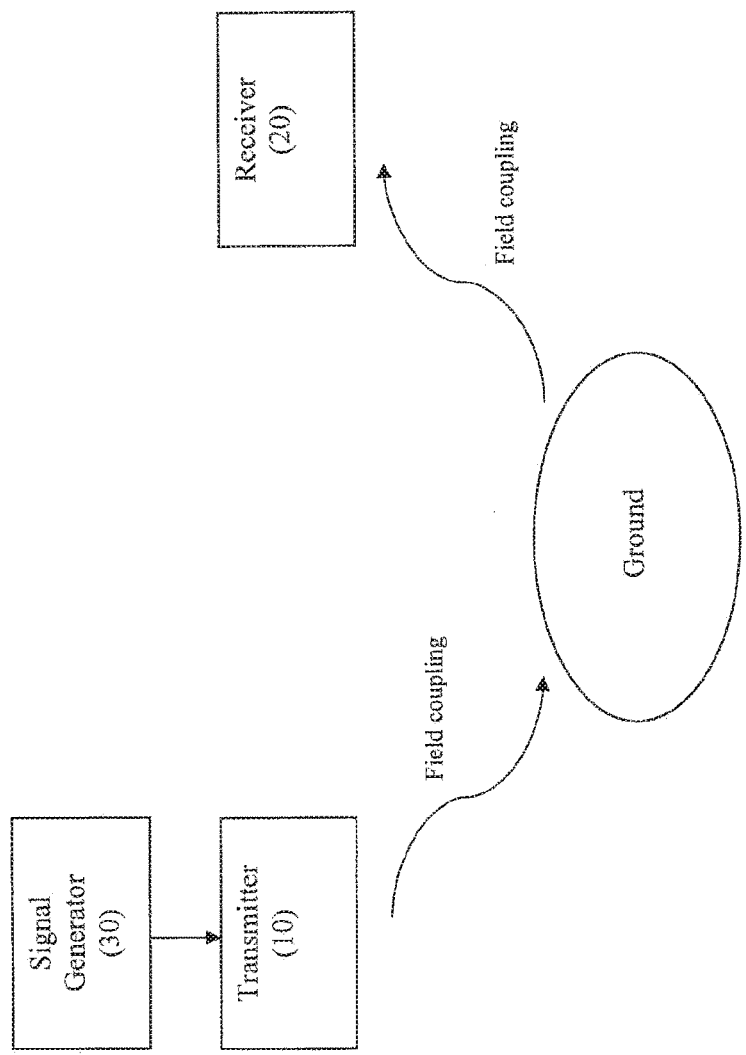
FIG. 2 is a block diagram of an example embodiment of an EM system.

The present invention may be implemented as an EM system such as the one shown using block diagrams in FIG. 2.

Referring to FIG. 2, the EM system comprises a transmitter section 10, which may include a signal generator 30, and a receiver section 20. The configuration, construction and operation of the receiver 20 and the associated receiver coils can be provided in accordance with conventional EM practice known to a person skilled in the art.

The present description provides an EM survey transmitter 10 for transmitting signals having a waveform comprising multiple pulses wherein at least two pulses are different in shape, power, or both.

In accordance with an example embodiment of the present disclosure, the electromagnetic transmitter section 10 is configurable to transmit signals having a waveform comprising at least a first pulse and a second pulse, wherein the first and second pulses are different in at least one of shape and power.

Figure 3:
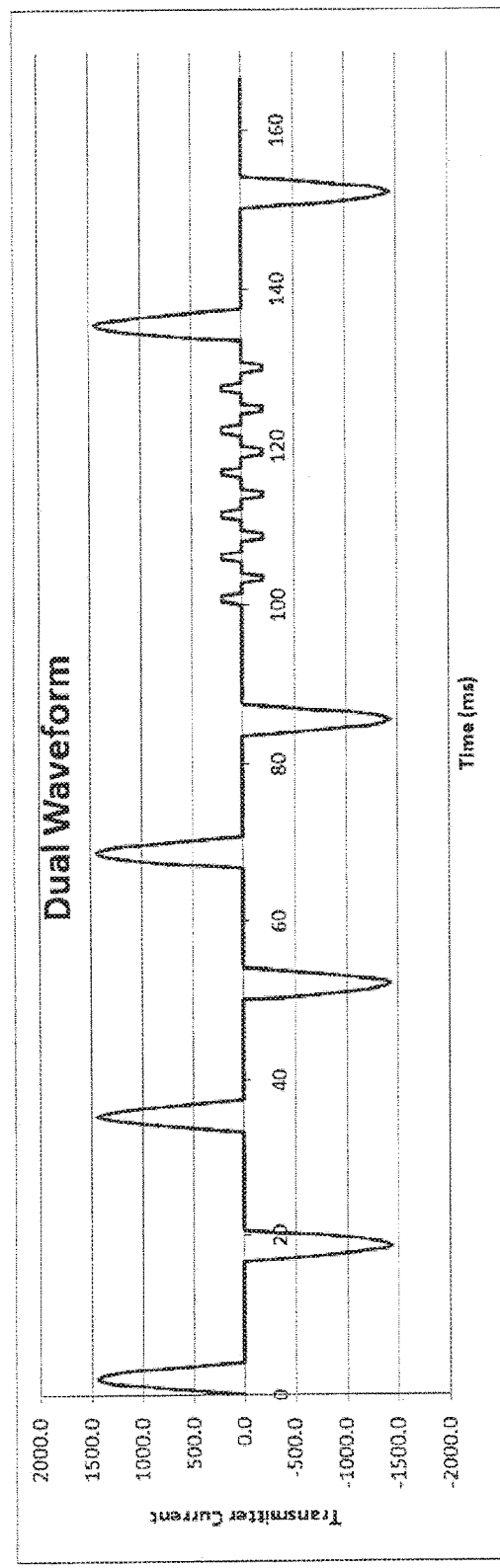
FIG. 3 shows an example of a dual waveform in accordance with prior art.

Referring to FIG. 3, in ground-based EM system existed in the prior art, such as the Geonics™ EM-37 system, dual transmitter waveforms were used to collect shallow and deep ground information, wherein repeated pulses of a first waveform are transmitted and measured, followed by the transmission and measurement of repeated pulses of a second waveform.

Figure 4:
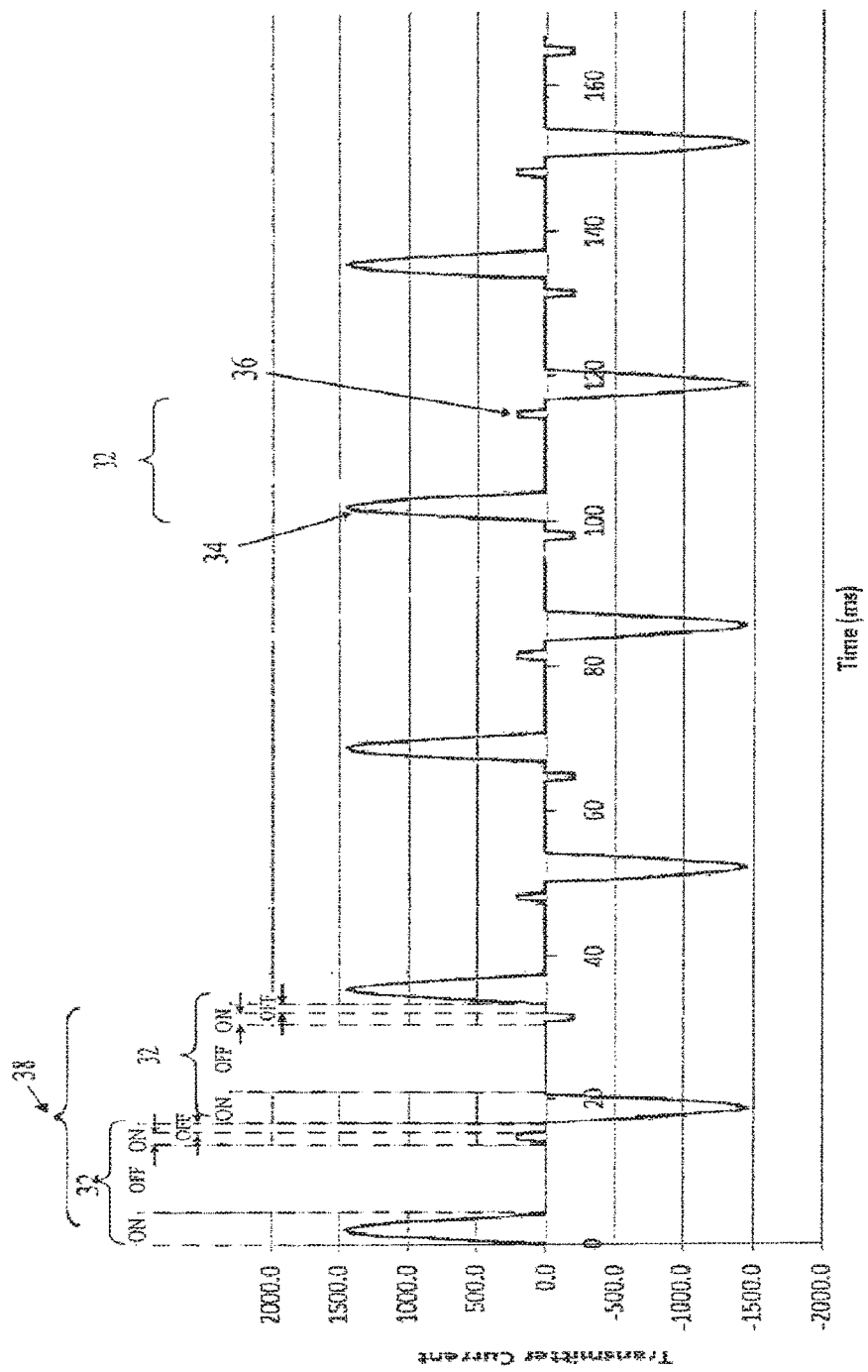
FIG. 4 shows an example waveform in accordance with an embodiment of the airborne EM system.

In contrast, referring to FIG. 4, an example waveform 32 in accordance with the present disclosure comprises multiple or a plurality of pulses including at least a first pulse 34 and a second pulse 36, wherein the first pulse 34 is different from the second pulse 36 in shape, and/or power.

As shown in FIG. 4, an EM waveform cycle 38 comprises more than one transmitted waveform 32 comprising pulses 34 and 36. Repeated waveforms 32 in a waveform cycle 38 can be the same or opposite polarity. Each pulse 34 and 36 of waveform 32 has an ON time period followed by an OFF time period. Measurements from pulses 34 and 36 are taken in the ON time and the OFF time of each pulse 34 and 36 with respect to transmitted waveform 32.

As illustrated in FIG. 4, signals having the waveform 32 can be repeatedly transmitted and the ground responses measured during the ON and OFF time periods of the EM waveform cycles. Namely, multiple distinct pulses are combined within EM waveforms and multiple waveforms within cycles of pulsed signal transmission, and responses thereof are measured in respective EM cycles.

In some embodiments, waveforms 32 comprising multiple distinct pulses are transmitted in at least some EM cycles of the entire survey task. This allows a mixed use of the multi-pulse waveform 32 disclosed herein and the conventional pulsed signals to conduct survey over a wide variety of terrains including simple geology, complex geology, or a mixture thereof.

The plurality of pulses within a waveform 32 may have various characteristics including shape, amplitude, phase, frequency, and polarity, and may be arranged in any suitable order or any suitable manner to form the waveform 32 as described herein.

Figure 5:
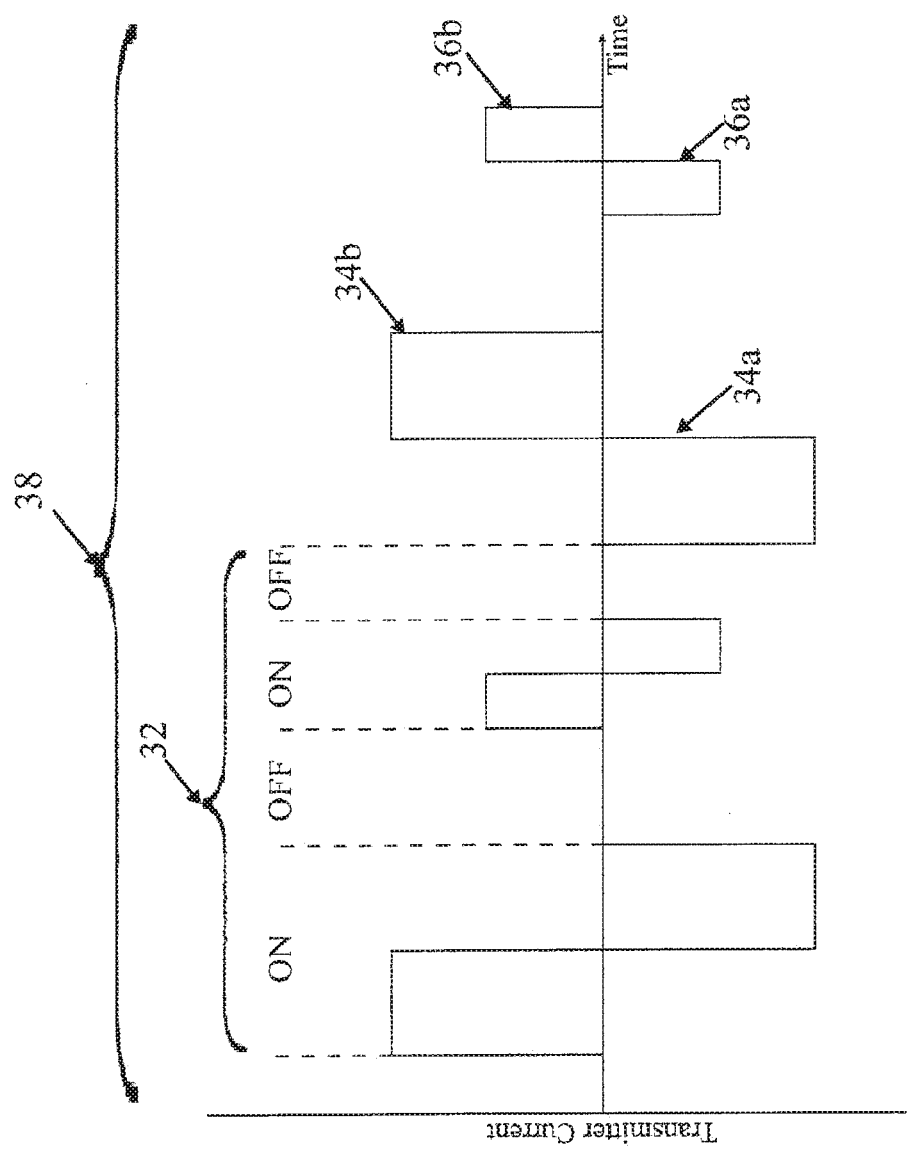
FIG. 5 shows an example waveform in accordance with an embodiment of the airborne EM system.

For example, as shown in FIG. 5, waveform 32 may comprise bi-polar pulses (34a, 34b) and (36a, 36b) that are different in at least one of shape and power.

In some embodiments, at least one pulse of waveform 32 can be repeated within an EM cycle 38 of the waveform 32.

Figure 6:
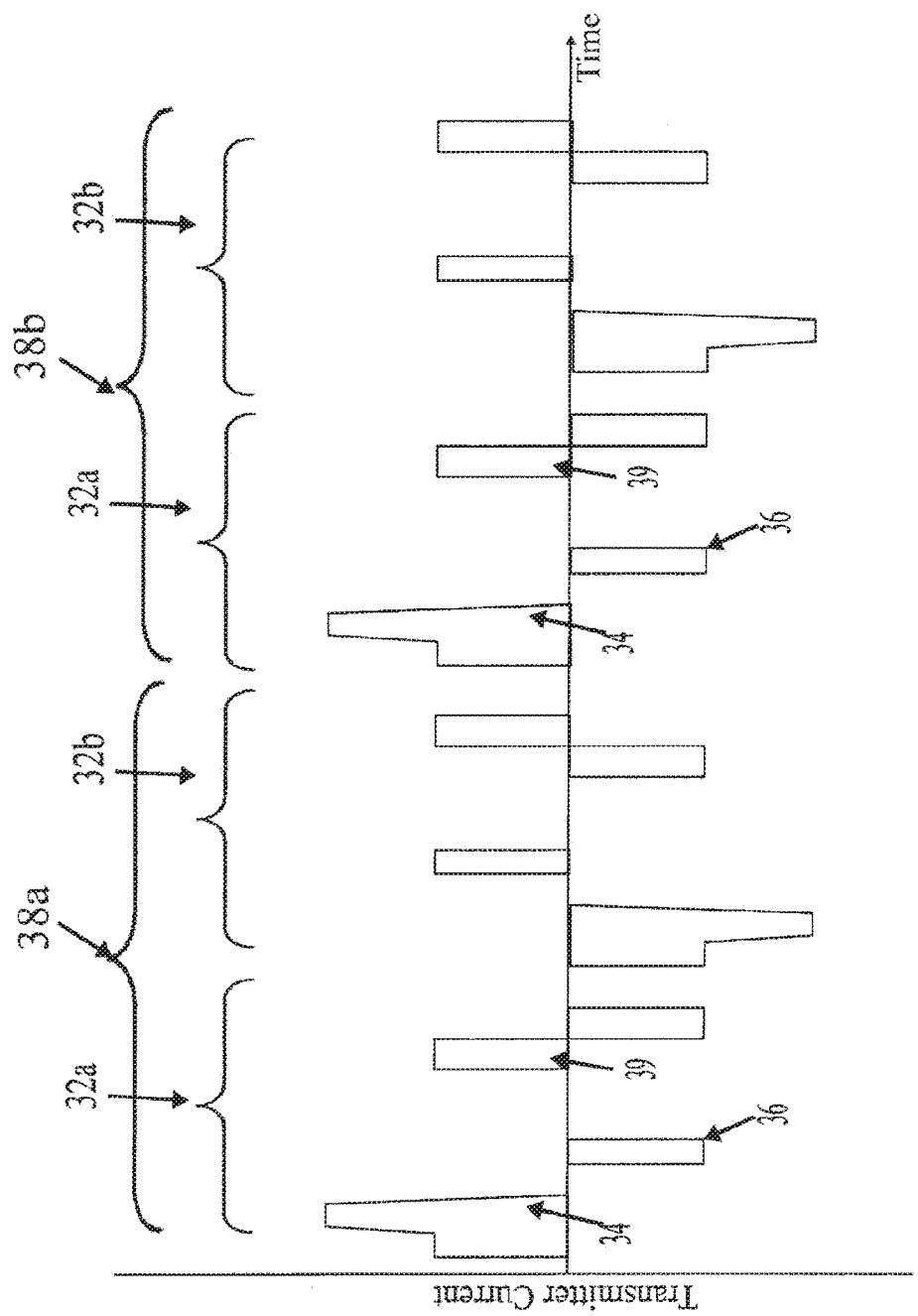
FIG. 6 shows an example waveform in accordance with an embodiment of the airborne EM system.

Referring to FIG. 6, an example waveform 32 in accordance with the present disclosure comprises distinct pulses (for example, 34, 36, and 39) that have different ON times or base frequencies, and includes pulses having a stepped pulse shape 34. A person skilled in the art would appreciate that various other pulse shapes can also be used in forming the waveform 32, including irregular, triangular, saw-tooth, square, sinusoidal shapes or the like or any combination of any number of the above.

Preferably, signals formed from various waveforms 32 disclosed herein are transmitted by the transmitter 10 at a predetermined repetitive rate for the duration of at least some EM cycles of a survey task, enabling the collection of consistent data over the entire survey area. However, a person skilled in the art would appreciate that waveform 32 can be transmitted in any fashion suitable for a particular application, including in a random manner, at a constant repetition frequency, or at a variable repetition frequency.

Preferably, at least two of the distinct pulses 34 and 36 of a waveform 32 have the same repetition rate.

In some embodiments, the EM transmitter 10 transmits waveforms 32 wherein the distinct pulses 34 and 36 have different repetition rates or base frequencies.

Advantageously, transmitting signals using waveforms 32 disclosed herein provides substantially simultaneous measurements of the earth response from multiple distinct pulses 34 and 36 that may be optimized for various aspects of a survey task, including deep and shallow geological structures, strong and weak conductivities, and/or variations in extent and orientation of the survey targets. For example, the pulses having higher power can be used to detect deeper geological structures, and higher frequency pulses can be used to detect shallower geology.

Preferably, the delay between the starting times of consecutive cycles 38 of waveform 32 is configurable in accordance with the needs of a particular survey task. In other words, the repetition rate or base frequency of waveform 32 is configurable.

Advantageously, the repetition rate of waveform 32 can be configured to allow response data collection at the highest possible resolution from all distinct pulses included in waveform 32.

A preferred delay between transmission of the adjacent pulses 34 and 36 of the waveform 32 can be configured so that the EM system would have moved a small distance during each consecutive pulse 34 and 36. Therefore the resolution of data measured from the pulses 34 and 36 is much higher comparing to that of the prior art systems and methods, thereby providing a significant advantage in defining geology.

For example, if an airborne EM system is conducting a survey at 30 Hz repetition rate, then the preferred delay between pulses 34 and 36 of a waveform 32 can be configured to be less than 16.6 ms and more preferably 10 ms or less, so that the movement of the EM system between the pulses 34 and 36 of the waveform 32 would be minimized or rendered negligible, thereby enabling substantially simultaneous pulse transmission and measurement thereof. Therefore the resolution of data measured from pulses 34 and 36 is much higher comparing to that of the prior art systems and methods, thereby providing a significant advantage in defining geology. The delay between pulses 34 and 36 could be longer or shorter when surveying at a lower or higher repetition rate or base frequency.

The embodiments of the present invention thus enable combining various pulses 34 and 36 that are optimal for respective applications to form a transmitter waveform 32 for conducting a geological survey.

In effect, the embodiments of the present invention provides an EM system that is substantially equivalent to multiple EM systems operating at the same time for collecting data in relation to different aspects of the geology of interest.

Advantageously, the benefits of the present invention can be obtained without the undesirable complexity and cost associated with the simultaneous deployment of multiple EM systems.

The embodiments disclosed herein therefore provide an EM system that is configurable to transmit signals having a waveform comprising multiple pulses that are different in shape and/or power.

In some embodiments, the EM system comprises a transmitter 10 for transmitting signals having a waveform 32 comprising at least a first pulse 34 and a second pulse 36, wherein the first and second pulses are different in at least one of shape and power; and a receiver 20 for measuring responses from the transmitted signals.

Preferably, the signals having waveform 32 are transmitted by transmitter 10 without overlap in time. In other words, the beginning of a cycle 38b of waveform 32 follows the end of a preceding cycle 38a of waveform 32, as shown in FIG. 6.

Preferably, receiver 20 of the EM system measures the responses from waveform 32 during and after each pulse of waveform 32 that is transmitted.

The waveform 32 disclosed herein can be generated using one or more signal generator 30, which comprises circuitry means for generating electrical currents, shaping and adjusting the currents as a function of the various parameters of the EM system into pulses, and means for combining the pulses into a desirable waveform 32.

EM transmitter 10 for transmitting signals in waveform 32 as disclosed herein can be used in various EM survey systems, and in particular in airborne EM systems. For example, in accordance with the present disclosure, a method of conducting geological survey comprises transmitting EM signals having a waveform comprising at least a first pulse and a second pulse, the first and second pulses being different in at least one of shape and power; and measuring responses from said signals.

In some embodiments, the EM system described herein comprises a signal processor or means for processing the EM data. In particular, the signal processor extracts measurements corresponding to the distinct pulses of the transmitted waveform 32, and interprets the corresponding measurements in light of all measurements to estimate distribution of conductivity in the subsurface and various aspects of the geology of interest.

A person skilled in the art would appreciate that the above described invention may be used in any electromagnetic system using pulse transmitter waveforms where applicable and is not strictly restricted to an airborne EM system.

For illustrative purpose only, the general configuration of an airborne EM system is described. It is to be expressly understood that the description and drawings are only for the purpose of illustration and as an aid to understanding, and are not intended as a definition of the limits of the invention.

Figure 7:
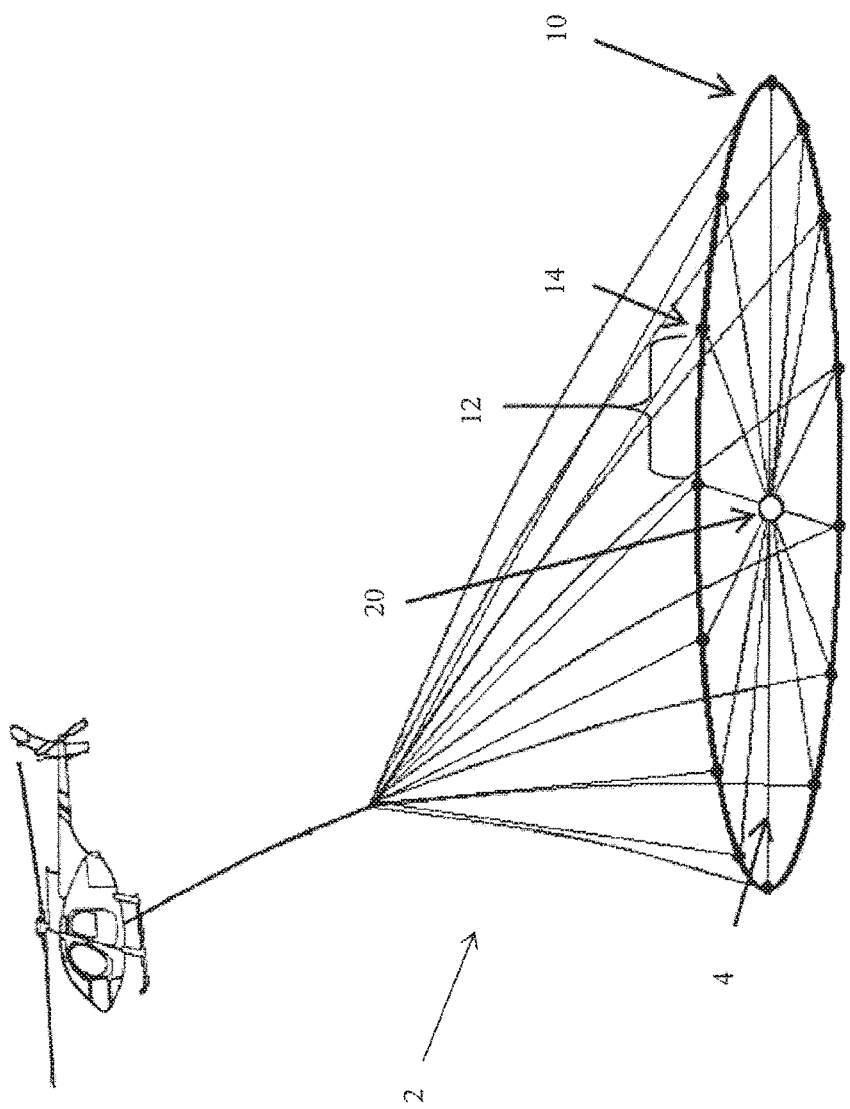
FIG. 7 is a schematic perspective view of an illustrative embodiment of the airborne EM system in an airborne position flying at surveying speeds.

For example, referring FIG. 7, an aircraft towed EM survey system generally comprises a tow assembly 2 comprising a transmitter section 10 and a receiver section 20. The aircraft can be manned or unmanned power driven fixed-wing airplane, helicopter, airship or any other flying machine, as a person skilled in the art would appreciate. The transmitter section 10 may comprise a transmitter loop frame which supports a transmitter loop coil for generating a primary electromagnetic field that induces a secondary electromagnetic field in the ground. The transmitter frame may comprise tubular sections 12 that are serially connected at a plurality of joints 14 as shown in FIG. 7. However, a person skilled in the art would appreciate that the systems disclosed herein may work with any type of transmitter or generator as a source of electromagnetic energy.

In some embodiments, the transmitter frame comprises tubular sections 12 that are made of generally rigid or semi-rigid material. For example, materials such as carbon fiber reinforced plastic, carbon fiber reinforced polymer, unplasticized polyvinyl chloride (uPVC), wood/plastic composite, or any other composite or materials that provide strong rigidity, stability and resistance to deformation, can be used to construct tubular sections 12 or portions thereof.

In some embodiments, lightweight materials are used for constructing tubular sections 12 or transmitter section 10 to allow for constructing sizable transmitter frame without significantly increasing the weight thereof.

Using rigid material to construct the transmitter section 10 may allow its size to be increased while maintaining its overall stability and structural integrity.

In some embodiments, the tubular sections 12 are connected in a manner that substantially eliminates the relative rotation between the connected tubular section 12, thereby allowing the transmitter frame to retain a rigid shape during operation, or preventing distortion of the shape of the transmitter section 10.

The rigid and modular transmitter frame 10 provides stable support for large transmitter loop and will maintain its rigidity and stability as the size of the transmitter loop varies. For example, transmitter loop having diameter in excess of about 30 meters and weight of about 500 kg can be achieved.

The receiver section 20 of the example embodiment shown in FIG. 7 is positioned along a central axis that is substantially perpendicular to the plane defined by the transmitter frame, and is coupled to the transmitter section 10 by a plurality of cross support means 4 such as cross ropes or cross bars or rods. However, a person skilled in the art would appreciate that the systems disclosed herein may work with any type of receiver section 20 in other suitable configurations. For example, the receiver section 20 may be disposed in a co-planar fashion with the transmitter section 10, or may be concentric or co-axial with the transmitter section 10. The receiver section 20 may be positioned above, within, or below the plane as defined by the transmitter section 10, at the center of the transmitter section 10, and/or offset from the center of the transmitter section 10. The receiver section includes a receiver which may be supported in any manner known in the art and may comprise at least one receiver coil.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

We claim:

1. An electromagnetic survey system, comprising:
a signal generator;
a transmitter connected to the signal generator and configured to produce, with a transmitter loop coil, electrical current signals having a waveform comprising at least a first pulse and a second pulse, said first pulse and second pulse are different in at least one of shape and power; and
a receiver for measuring responses induced by said electrical current signals, the receiver including at least one receiver coil,
wherein a value of each of the first and second pulses continuously changes in time during at least a portion of an ON time period, and
wherein the first pulse is sandwiched by two second pulses and the second pulse is sandwiched by two first pulses.

2. The electromagnetic survey system of claim 1, wherein said waveform is transmitted at a predetermined repetition rate.

3. The electromagnetic survey system of claim 1, wherein said first pulse and second pulse have the same repetition rate.

4. The electromagnetic survey system of claim 1, wherein:
the electromagnetic survey system comprises an airborne electromagnetic system conducting an electromagnetic survey at a predetermined repetition rate; and
the transmitter sets a delay between the first pulse and the second pulse of the waveform based on the predetermined repetition rate so that movement of the airborne electromagnetic system between the first pulse and the second pulse is rendered negligible and simultaneous pulse transmission and pulse measuring is enabled.

5. The electromagnetic survey system of claim 4, wherein:
the predetermined repetition rate comprises 30 Hz; and
the delay is less than 16.6 ms.

6. A transmitter for an electromagnetic survey system for transmitting signals, the transmitter comprising:
a signal generator; and
one or more coils connected to the signal generator and configured to produce electrical current signals having a waveform comprising at least a first pulse and a second pulse, said first pulse and second pulse being different in at least one of shape and power,
wherein a value of each of the first and second pulses continuously changes in time during at least a portion of an ON time period, and
wherein the first pulse is sandwiched by two second pulses and the second pulse is sandwich by two first pulses.

7. The transmitter of claim 6, wherein said waveform is transmitted at a predetermined repetition rate.

8. The transmitter of claim 6, wherein said first pulse and second pulse have the same repetition rate.

9. A method of conducting geological survey, comprising:
producing, with one or more coils, electrical current signals based on a signal generator, the electrical current signals having a waveform comprising at least a first pulse and a second pulse, said first pulse and second pulse are different in at least one of shape and power; and
measuring, with at least one receiver coil, responses induced by said electrical current signals,
wherein a value of each of the first and second pulses continuously changes in time during at least a portion of an ON time period, and
wherein the first pulse is sandwiched by two second pulses and the second pulse is sandwich by two first pulses.

10. The method of claim 9, wherein said waveform is transmitted at a predetermined repetition rate.

11. The method of claim 9, wherein said first pulse and second pulse have the same repetition rate.

12. The method of claim 9, wherein:
producing electrical current signals further comprises transmitting an electromagnetic waveform cycle comprising repeated transmissions of the waveform; and
the first pulse and the second pulse are different in shape in each repeated transmission of the waveform.

13. The method of claim 9, wherein:
producing electrical current signals further comprises transmitting an electromagnetic waveform cycle comprising repeated transmissions of the waveform; and
the repeated transmissions of the waveform in the electromagnetic waveform cycle comprise a bi-polar pulse and at least one pulse that is not a bi-polar pulse.

14. The method of claim 9, wherein:
producing electrical current signals further comprises transmitting a plurality of electromagnetic waveform cycles;

each waveform cycle in the plurality of electromagnetic waveform cycles comprises multiple waveforms; and
each waveform comprises a plurality of distinct pulses having at least one of different on times and base frequencies.

15. The method of claim 14 wherein:
at least one waveform in the multiple waveforms comprises the first pulse and the second pulse; and
measuring responses further comprises measuring responses during on time periods and off time periods of the first pulse and the second pulse in each one of the plurality of electromagnetic waveform cycles.

16. The method of claim 15, wherein producing electrical current signals further comprises transmitting the at least one waveform in only some of the plurality of electromagnetic waveform cycles.

17. The method of claim 9, wherein:
the first pulse and the second pulse of the waveform each comprise the ON time period followed by an OFF time period; and
measuring responses further comprises measuring responses from each one of the first pulse and the second pulse during the ON time period and the OFF time period of each one of the first pulse and the second pulse.

18. The method of claim 9, wherein the first pulse and the second pulse comprise bi-polar pulses.

19. The method of claim 10, wherein:
producing electrical current signals further comprises transmitting signals from an airborne electromagnetic system conducting an electromagnetic survey at the predetermined repetition rate; and
the method further comprises setting a delay between the first pulse and the second pulse of the waveform based on the predetermined repetition rate so that movement of the airborne electromagnetic system between the first pulse and the second pulse is rendered negligible and simultaneous pulse transmission and pulse measuring is enabled.

20. The method of claim 19, wherein:
the predetermined repetition rate comprises 30 Hz; and
the delay is less than 16.6 ms.

* * * * *